United States Patent Office 3,109,856
Patented Nov. 5, 1963

3,109,856
STABILIZATION OF ACRYLONITRILE
Calvin Charles Rolland and Ronald Edward Duncan, New Orleans, La., assignors to American Cyanamid Company, New York, N.Y., a corporation of Maine
No Drawing. Filed Oct. 30, 1959, Ser. No. 849,720
14 Claims. (Cl. 260—465.9)

This invention relates to the stabilization of acrylonitrile. More particularly, it relates to a method for inhibiting the polymerization of acrylonitrile and to the stabilized composition so obtained.

Acrylonitrile is a colorless, volatile, organic liquid with a fairly pungent odor, soluble in most organic solvents. In recent years, acrylonitrile has become an increasingly important starting material in the manufacture of many products. Thus, for example, acrylonitrile readily polymerizes with other vinyl monomers to produce materials having increased hardness, toughness, and excellent resistance to oil, solvents, and chemicals. Such polymers are employed in a wide variety of products, such as textiles, rubbers, plastics, surface coatings, and adhesives. In addition, acrylonitrile because of its bifunctional activity is widely used as an intermediate for preparation of various antioxidants, chemotherapeutic agents, dyes, emulsifying agents, pesticides, leather and paper chemicals, and solvents.

During the manufacture, refining, shipment, and storage of acrylonitrile, however, difficulty has frequently been encountered because of the tendency or characteristic of acrylonitrile to undergo polymerization when exposed to air, light, or relatively high temperatures for short periods of time or normal temperatures for extended periods of time.

A particularly vexing problem arises when acrylonitrile is subjected to storage at normal temperatures or is in contact with air or light for a prolonged period of time for a gradual darkening of acrylonitrile is first noted and subsequently polymer formation is observed. In view of the wide variety of applications which have been found and may be found for acrylonitrile, it is exceedingly important that acrylonitrile be free of polymer since only substantially pure monomer may be used in and for the preparation of satisfactory products such as those enumerated above.

It has heretofore been proposed to add various stabilizers or inhibitors to acrylonitrile in order to prevent, retard, or forestall polymerization of acrylonitrile. In general, however, these inhibitors which were used in the past have proved to be unsatisfactory for one or more various reasons. Many, for example, failed to prevent or inhibit polymerization to any appreciable degree. Other materials failed to prevent polymerization over a sufficiently long period of time. Still others required too large an amount in order to obtain the required degree of stabilization. Some others were noted to impart an objectionable dark color or odor to acrylonitrile.

It is known, of course, that one of the more effective stabilizers of acrylonitrile has been gaseous or liquid ammonia. Thus, in U.S. Patent No. 2,432,511 it is disclosed that acrylonitrile may be effectively stabilized against deterioration in manufacture, storage and shipment by adding thereto or producing therein ammonia in trace quantities or in amounts up to about 0.1%. Although this method of stabilization of acrylonitrile has been effectively employed for some time nonetheless a serious disadvantage is also found in this particular method. When ammonia is added to acrylonitrile it has been found necessary that in order to achieve the maximum degree of stabilization the acrylonitrile containing ammonia must be aged. It is believed that upon standing for an unspecified interval of time i.e. an aging period, most probably the acrylonitrile reacts with the ammonia and certain reaction products effective for stabilization are formed. It is thus apparent that even using the method of U.S. Patent No. 2,432,511 immediate stabilization of acrylonitrile is not thereby accomplished. It has consequently been recognized that if the period of aging could be decreased to a measurable extent it would be possible to effect reduction in the overall production cost of acrylonitrile.

It is an object of this invention to overcome the above-described difficulties and disadvantages of the stabilizers or inhibitors of the prior art and to provide a practical, simple and highly effective method for preventing or inhibiting the polymerization of acrylonitrile when it is exposed to air, light, or elevated temperatures for extended periods of time. It is a further object of this invention to inhibit polymerization of acrylonitrile when the same is stored and shipped under normal temperature conditions. It is a still further object of this invention to inhibit such polymerization through the addition of a relatively small amount of a material without producing undesirable side effects such as discoloration, bad odor, and the like.

It has now been found that if trace quantities of elemental copper or a copper compound or mixtures thereof are added to acrylonitrile already containing ammonia, acrylonitrile need not be aged for a protractive period of time before it will pass the standard test used in determining the degree of stability of the nitrile. In other words, acrylonitrile containing ammonia to which elemental copper or a copper compound or a mixture thereof has been added immediately passes the oxygen bomb test, a test which is customarily employed in the determination of stability of acrylonitrile and which test will be explained in more detail hereinafter. While it is not known whether elemental copper or the copper compounds act as inhibitors to stabilize the acrylonitrile or whether these materials act as catalysts to produce other substances which stabilize acrylonitrile, they have nonetheless found to be surprisingly effective and for this reason no particular theory as to the mechanism by which increased stability is achieved is deemed to be necessary. Quite unexpectedly, it has been discovered that by adding as small a quantity as 0.01 part per million of elemental copper or copper compound to acrylonitrile containing ammonia polymerization stability under normal temperature conditions of storage and shipment as well as at elevated temperatures may be substantially improved. It is generally preferred, however, that from about 0.02 to about 0.1 part per million should be incorporated to obtain the most effective stabilization. It is also possible that an amount greater than 0.1 part per million of elemental copper or copper compound may be employed with a desirable upper limit being approximately 0.2 part per million. Although it is possible that an amount greater than 0.2 part per million of elemental copper or copper compound may be added no particular advantage is considered to be obtained thereby. When the amount of copper compound added to acrylonitrile is specified herein as being at least 0.01 part per million, it is intended that by this is meant that this quantity would be that which would be provided by the addition of at least 0.01 part per million of elemental copper. Furthermore, of course, it is possible and within the scope of this invention to employ combinations of copper and copper compound and of at least two copper compounds to obtain a polymerization stabilized acrylonitrile.

The stabilizers or inhibitors of the present invention may be incorporated or added to the acrylonitrile which contains ammonia at any of the various stages of processing. It is generally preferred, however, that the stabilizer or inhibitor of the present invention should be added to purified acrylonitrile to which has been added or incorporated therewith ammonia prior to its being shipped or stored.

Elemental copper in the form of gauze, shot, powder, sheet, and the like may be employed as an effective stabilizer according to the present invention. The use of elemental copper in such forms affords an easy and simple method for conveniently providing a substance, which most probably is obtained from the reaction of copper with materials which may be present in acrylonitrile either as by-products or impurities, which will act to inhibit or retard polymerization.

However, even when oxidized steel wool which has been found to contain small amounts of copper is placed in contact with acrylonitrile having ammonia present therein immediate stability is also thereby achieved. This is indeed quite unexpected since heretofore the presence of trace metals in acrylonitrile has been considered to be objectionable. One particular method which may be employed for obtaining a polymerization stabilized acrylonitrile when oxidized steel wool is employed is to merely pass the acrylonitrile having present therein ammonia in contact with or through steel wool for a brief period of time, e.g. five to ten minutes. The amount of copper which may be considered to be leached from the steel wool is usually in the order of at least 0.01 part per million of acrylonitrile.

Of the compounds of copper which are particularly effective in inhibiting the polymerization of acrylonitrile containing ammonia therein salts of various acids, e.g. organic acids, weak acids and even mineral acids having non-obnoxious anions, may be employed. Of the many copper compounds which may be used there may be mentioned, inter alia, the following: cupric acetate, cupric benzoate, cuprous bromide, cupric bromide, cuprous carbonate, cupric carbonate, cuprous chloride, cupric chloride, cuprous cyanide, cupric cyanide, cupric formate, cuprous hydroxide, cupric hydroxide, cuprous iodide, cupric lactate, cupric laurate, cupric nitrate, cupric nitrite, cupric oleate, cupric oxalate, cuprous oxide, cupric oxide, cupric palmitate, cupric stearate, cuprous sulfate, cupric sulfate, cuprous sulfide, cupric sulfide, cuprous sulfite, cupric tartrate, cuprous thiocyanate, cupric thiocyanate, and the like.

In order to demonstrate the effectiveness of the inhibitors of the present invention, the oxygen bomb induction method (A.S.T.M. D525–39T), commonly employed in the petroleum industry for testing the stability of gasolines, has been utilized. In the oxygen bomb test, as used in accordance with the present invention, an open glass container holding a 25 ml. of acrylonitrile is placed in a stainless steel bomb fitted to a pressure recording device and the bomb is then tightly closed. Oxygen is slowly added until a pressure of 100 p.s.i. at room temperature is obtained. The bomb is then heated in a steam bath and pressure recorded over a period of four hours.

As the bomb becomes heated the pressure rises gradually to about 140 p.s.i. If the sample is unstable, the pressure, after levelling off, will drop sharply and then increase rapidly indicating that rapid polymerization of acrylonitrile to a yellow solid has taken place. If no pressure drop is observed and no solid polymer is formed during a four hour period, the acrylonitrile sample is considered to be stable. The oxygen bomb test is a valuable index to the stability of acrylonitrile, in that it greatly intensifies deterioration which takes place in ordinary storage and indicates the relative period over which the product can be stored without deterioration.

A series of experiments employing the oxygen bomb method of determining stability was conducted on acrylonitrile free of inhibitor, on acrylonitrile having incorporated therein ammonia and on acrylonitrile containing ammonia and an inhibitor according to the present invention. The samples when containing an inhibitor such as ammonia and the inhibitors of the present invention were made up to the desired concentration by dissolving a weighed sample of stabilizer or inhibitor in the required amount of unstabilized acrylonitrile. The results of these experiments are given in the following table.

| Inhibitor | Conc., p.p.m. | Req. Aging Time | Remarks |
| --- | --- | --- | --- |
| Acrylonitrile | | | 0 | Failed bomb test, 1 hr. |
| Do | Ammonia | 50 | 0 | Failed bomb test, 1½ hr. |
| Do | do | 50 | 2 weeks | Passed bomb test, 4 hrs. |
| Acrylonitrile +50 p.p.m. NH₃ | Cuprous Cyanide | .03 | 0 | Do. |
| Do | Copper (powder) | .03 | 0 | Do. |
| Do | Cupric Chloride | .03 | 0 | Do. |
| Do | Cuprous Chloride | .03 | 0 | Do. |
| Do | Cupric Oxide | .03 | 0 | Do. |
| Do | Cuprous Oxide | .03 | 0 | Do. |
| Do | Cupric Sulfide | .03 | 0 | Do. |
| Do | Oxidized Steel Wool | Contact Time 5 min. | 0 | Do. |

The table shows acrylonitrile with no inhibitor rapidly polymerized. For the required polymerization stability using ammonia 50 parts per million of ammonia an aging period is necessary in order to produce a stable acrylonitrile product. However, when 0.03 part of cuprous cyanide is added to the acrylonitrile containing ammonia it is noted that immediate stability is effected. Similarly, when copper (powder), cupric chloride, cuprous chloride, cupric oxide, cuprous oxide, and cupric sulfide are added immediate stability is achieved. Further, when acrylonitrile containing ammonia is contacted with oxidized steel wool containing copper immediate stability is also accomplished.

We claim:

1. A process for inhibiting the polymerization of acrylonitrile having present therein a stabilizing amount of ammonia which comprises establishing therein a concentration of copper from about 0.01 to about 0.2 part per million based upon the weight of acrylonitrile.

2. A process according to claim 1 in which said concentration of copper is provided by the addition of a copper salt.

3. A process according to claim 1 in which said concentration of copper is provided by the addition of elemental copper.

4. A process according to claim 2 in which the copper salt is cuprous cyanide.

5. A process according to claim 2 in which the copper salt is cuprous chloride.

6. A process according to claim 2 in which the copper salt is cupric chloride.

7. A process according to claim 2 in which the copper salt is cupric sulfide.

8. As a composition of matter, a polymerization stabilized acrylonitrile having present therein a stabilizing amount of ammonia and a copper concentration of about 0.01 to about 0.2 part per million based upon the weight of acrylonitrile.

9. A composition according to claim 8 in which said copper concentration is provided by the addition of a copper salt.

10. A composition according to claim 8 in which said copper concentration is provided by the addition of elemental copper.

11. A composition according to claim 9 in which the copper salt is cuprous cyanide.

12. A composition according to claim 9 in which the copper salt is cuprous chloride.

13. A composition according to claim 9 in which the copper salt is cupric chloride.

14. A composition according to claim 9 in which the copper salt is cupric sulfide.

References Cited in the file of this patent

UNITED STATES PATENTS

| | | |
|---|---|---|
| 2,125,685 | Nicodemus et al. | Aug. 2, 1938 |
| 2,351,157 | Semon | June 13, 1944 |
| 2,356,247 | Kirk et al. | Aug. 22, 1944 |
| 2,432,511 | Davis et al. | Dec. 16, 1947 |
| 2,467,373 | Dutcher et al. | Apr. 19, 1949 |
| 2,671,107 | Beckberger | Mar. 2, 1954 |
| 2,683,163 | Nichols | July 6, 1954 |
| 2,684,978 | Stehman | July 27, 1954 |
| 2,691,037 | Bellringer et al. | Oct. 5, 1954 |
| 2,726,258 | Stehman | Dec. 6, 1955 |
| 2,734,909 | Gee | Feb. 14, 1956 |
| 2,741,631 | Sauer | Apr. 10, 1956 |
| 2,784,219 | Couvillon | Mar. 5, 1957 |